United States Patent

[11] 3,612,197

[72] Inventor Hiroyasu Motoyama
 Tokyo, Japan
[21] Appl. No. 873,266
[22] Filed Nov. 3, 1969
[45] Patented Oct. 12, 1971
[73] Assignee Koken Sisui Kogyo Kabushiki Kaisha
 Tokyo, Japan
[32] Priority Dec. 24, 1968
[33] Australia
[31] 48341/68

[54] BIG HOLE DRILLING BIT
 3 Claims, 6 Drawing Figs.
[52] U.S. Cl. .................................... 175/364,
 175/372, 175/374, 175/410, 277/53, 277/205
[51] Int. Cl. .................................... E21b 9/10,
 E21b 9/36, F02f 15/44
[50] Field of Search .................... 175/361-364,
 371, 372, 374, 410; 308/8.2; 277/53, 58, 205

[56] References Cited
 UNITED STATES PATENTS

| | | | |
|---|---|---|---|
| 1,533,184 | 4/1925 | Gurney | 277/53 X |
| 2,121,202 | 6/1938 | Killgore | 175/374 |
| 2,644,671 | 7/1953 | Ingram | 175/372 X |
| 2,797,067 | 6/1957 | Fisher | 175/372 X |
| 3,216,513 | 11/1965 | Robbins et al. | 175/364 X |
| 3,382,940 | 5/1968 | Stebley | 175/410 |
| 3,389,760 | 6/1968 | Morris | 175/371 |

FOREIGN PATENTS

| | | | |
|---|---|---|---|
| 1,102,820 | 5/1955 | France | 175/372 |

Primary Examiner—Ian A. Calvert
Attorney—Stevens, Davis, Miller & Mosher

ABSTRACT: An improved large diameter hole drilling bit consisting of a cutter head with a plurality of yokes fixedly mounted on the cutter head and a like plurality of roller cutters each rotatably mounted on a yoke. The drilling bit is adapted to be supported by a drilling rod which is rotated by a power unit of the drilling machine. During drilling operation, the cutter head is rotated about the axis of the drilling bit and at the same time the roller cutters are rotated about their own axes with respect to the yokes by contact to the rock or the like. Each roller cutter includes a load pin supported by the yoke fixed on the cutter head, a cutter cone having cutting teeth or individually replaceable tips thereon and bearing balls and/or rollers interposed between the cutter cone and the load pin so that the cutter cone is supported for free rotation on the load pin. Pressure-responsive seals and dust filters prevent foreign material from passing into the bearings. The load pin, cutter cone and bearing are preferably held in permanent assembly.

3,612,197

PATENTED OCT 12 1971

INVENTOR
HIROYASU MOTOYAMA

BY Stevens, Davis, Miller & Mosher
ATTORNEY

BIG HOLE DRILLING BIT

The present invention relates to a drilling bit for excavating a big hole or large diameter hole in rock or the like.

The big hole, drilling bit consists of a cutter head, a plurality of yokes fixedly mounted on said cutter head and roller cutters each rotatably mounted on each of said yokes. The drilling bit is adapted to be supported by a drill rod which is rotated and propelled by a power unit of a drilling machine. During the drilling operation the cutter head is rotated on an axis of the drilling bit and at the same time the roller cutters are rotated on their own axes on the respective yokes by contact with the rock or the like.

In general the roller cutter includes a load pin supported by the yoke fixed on the cutter head, a cutter cone having cutting teeth or tips thereon and bearing balls and/or rollers interposed between said cutter cone and said load pin, whereby the cutter cone is supported on the load pin so as to be freely rotatable thereon. The load pin, the cutter cone and the bearing balls and/or rollers are usually held in permanently assembled relationship.

In such roller cutter wear is produced mainly on the two portions, namely on the cutting portion and on the bearing portion. However the degrees of wear on the two portions are different from each other, and before the wear on one of these portions has become excessive the roller cutter must be removed from the cutter head as a whole and replaced by a new one. It has been experienced that more wear is produced on the bearing portion than on the cutting portion, and consequently, if the wear on the bearing portion has reached a predetermined degree the entire roller cutter should be replaced by a new one even if the cutting portion is still usable. This is uneconomical in view of the fact that the cutting teeth or tip are very high in cost and usually occupy about 60 to 70 percent of the cost of the entire roller cutter.

It has been proposed to provide a construction of a roller cutter assembly in which a load pin, a cutter cone and a bearing can be disassembled so that only the cutter cone can be replaced by a new one. In such a construction, however, if a bearing surface or an inside surface of the cutter cone has been worn the cutter cone should be replaced by a new cutter cone even if the cutting portion is still usable.

Accordingly it is an object of the present invention to provide a drilling bit which eliminates the above disadvantages in the roller cutter.

It is an object of the present invention to provide a drilling bit which can reduce running cost of drilling.

It is another object of the present invention to provide a drilling bit in which a roller cutter is constructed from components which can be easily assembled and disassembled.

It is a further object of the present invention to provide a drilling bit in which a roller cutter is constructed from components each of which can be easily replaced by a new component without requiring replacement of the roller cutter as a whole.

It is another object of the present invention to provide a drilling bit in which a roller cutter includes a bearing assembly which can be easily removed and replaced by a new one without requiring replacement of a cutter cone.

It is another object of the present invention to provide a drilling bit in which a roller cutter includes a bearing assembly the wear of which is reduced to minimum by preventing foreign material from entering into the bearing assembly.

It is a further object of the present invention to provide a drilling bit in which a roller cutter comprises cutter tips which can be easily removed and replaced by new ones.

In accordance with the present invention there is provided a drilling bit for excavating a big hole, comprising a cutter head, a plurality of yokes fixedly mounted on said cutter head and roller cutters each rotatably supported on each of said yokes, each of said roller cutters comprising a load pin supported by said yoke, a bearing assembly including a pair of aligned inner races mounted on said load pin, an outer race and a set of bearing rollers and bearing balls located between said inner races and said outer race, and a cutter cone fixed on said outer race and having cutting portions thereon, said load pin, inner races, outer race, bearing rollers and balls and cutter cone being detachably assembled together to form the roller cutter.

Further in accordance with the present invention there is provided a drilling bit of the above kind, in which the cutter cone has a plurality of cutter tips which can be easily removed and replaced.

Now the invention will explained in detail with reference to the drawings which illustrate embodiments of the present invention in which.

Figure 1:
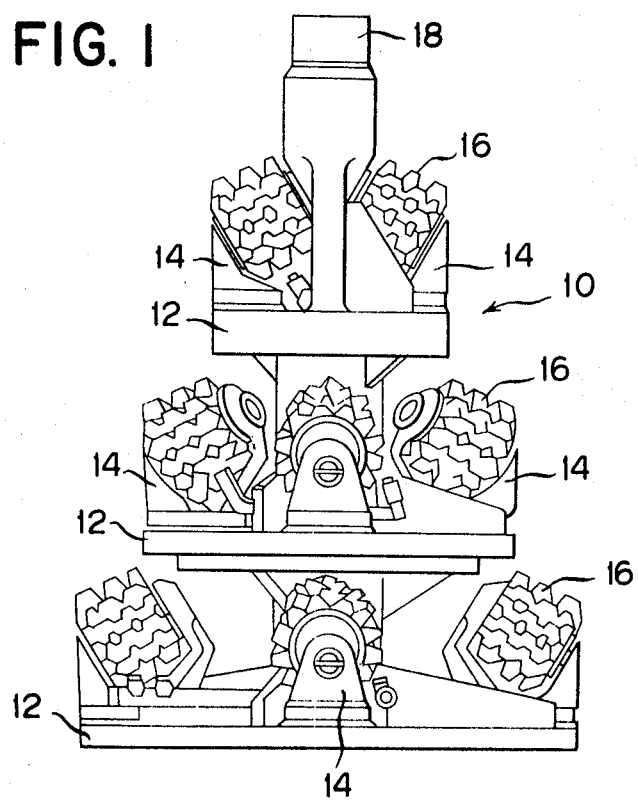
FIG. 1 is a side view of the drilling bit according to an embodiment of the present invention.

Referring to the drawings, the drilling bit generally indicated by 10 comprises a cutter head having a plurality of stages 12, yokes 14 fixedly mounted on the respective stages of said cutter head and roller cutters 16 each rotatably supported by each of said yokes. The drilling bit as shown in FIG. 1 is adapted to be connected by conventional coupling means 18 to a drill rod (not shown) and rotated and driven into the rock or the like.

Figure 2:
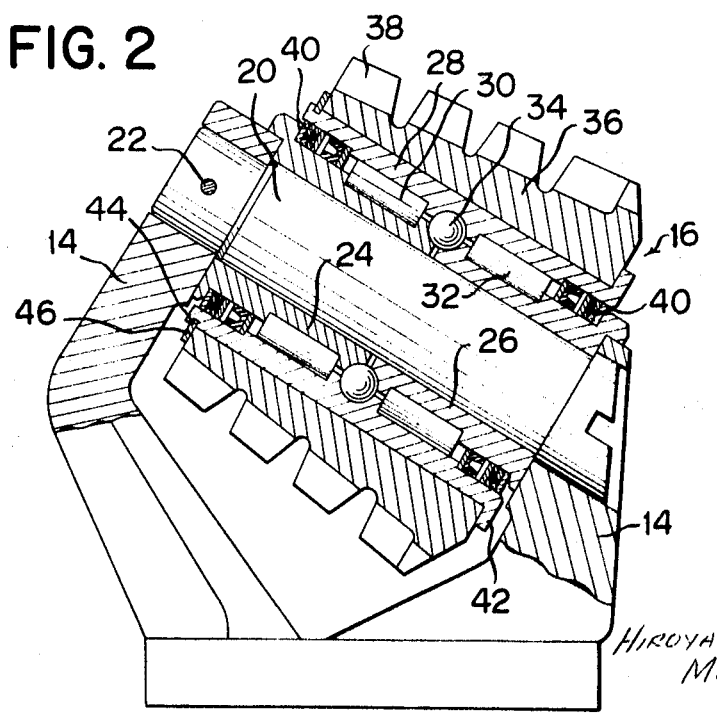
FIG. 2 is a sectional view, in enlarged scale, showing one cutter roller.
Figure 3:
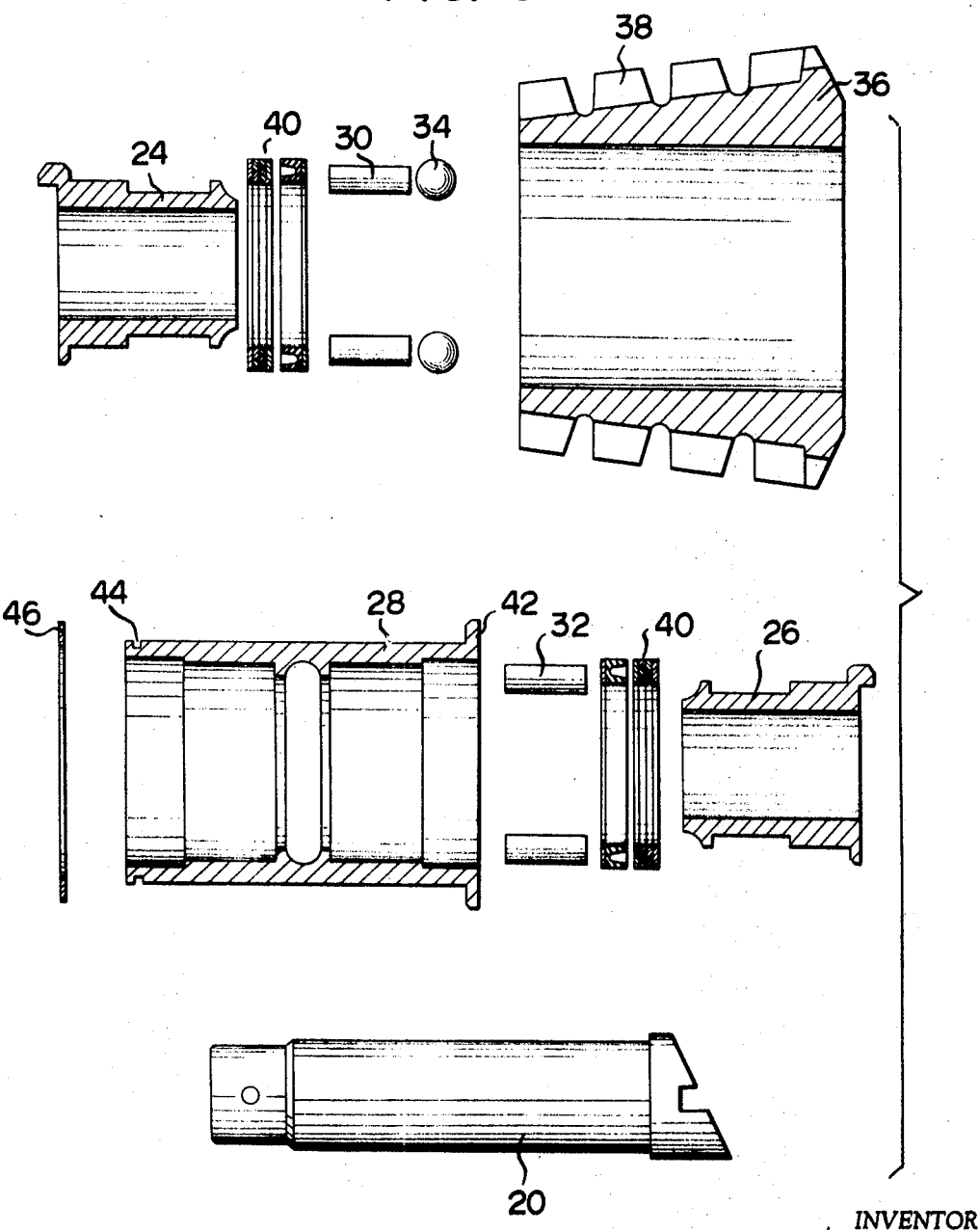
FIG. 3 is an exploded sectional view of the roller cutter shown in FIG. 2.

Each roller cutter 16 comprises a load pin 20 supported on the yoke 14 and fixed thereon by a lockpin 22, a bearing assembly including pair of aligned inner races 24 and 26 mounted on said load pin, an outer race 28 and a set of bearing rollers 30 and 32 and bearing balls 34 located between said inner races and said outer race, and a cutter cone 36 fixed on said outer race 28. The cutter cone 36 shown in FIG. 2 has cutting teeth 38 integrally formed thereon. Seals 40 are interposed between the outer race 28 and the inner races 24 and 26 of the bearing assembly at the both ends thereof to prevent foreign material from entering into the bearing assembly. The outer race 36 has a flange 42 at its one end and a peripheral groove 44 at its other end (FIG. 3). A snapring 46 is fitted into said peripheral groove 44, so that the cutter cone 36 is held on the outer race 28 between the flange 42 and the snapring 46.

The load pin 20, inner races 24 and 26, outer race 28, bearing rollers 30 and 32, bearing balls 34, cutter cone 36 and seals 40 are detachably assembled together to form the roller cutter. When assembling the roller cutter, the cutter cone 36 is mounted on the outer race 28 and fixed thereon by the snapring 46 fitted in the peripheral groove 44, and the inner races 24 and 26 with the seals 40 and the bearing rollers 30 and 32 and the bearing balls 34 are inserted into said outer race 28 from the both ends thereof. The assembled cutter cone and the bearing assembly are positioned in the yoke 14 and the load pin 20 is inserted and fixed by the lockpin 22. Thus the roller cutter is assembled and supported on the yoke 14. The disassembly of the roller cutter can be easily made by removing the lockpin 22, drawing the load pin 20 out of the yoke and then removing the inner races 24 and 26 and the outer race 28 from the cutter cone 28.

Figure 4:
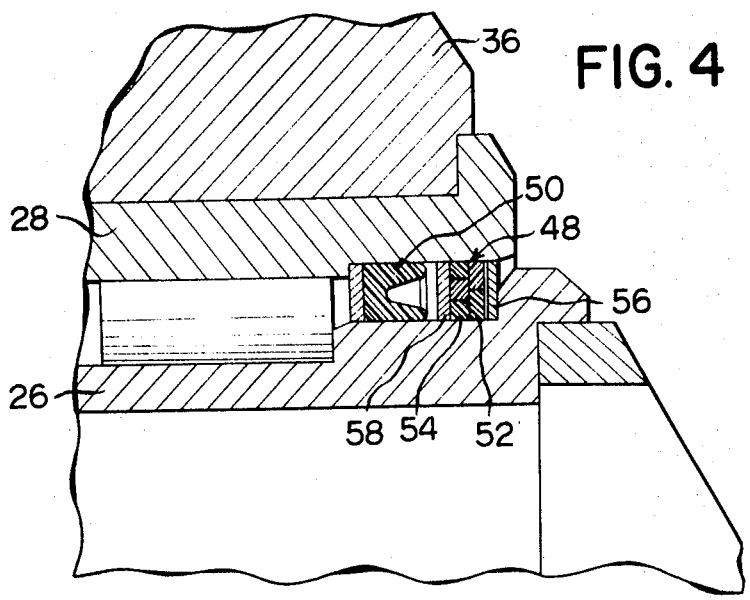
FIG. 4 is an enlarged sectional view of a part of FIG. 2.

The seal 40 consists of a dust filter 48 positioned on the axially outermost end of the roller cutter and a pressure-responsive packing 50 positioned axially inside of said dust filter 48 (See FIG. 4). The dust filter 48 includes two layers of filter rings 52 and 54 held between metal rings 56 and 58, one layer of filter ring 52 having concentrically arranged two rings made of sealing material and the other layer 54 having concentrically arranged three rings of the same material. The pressure-responsive packing 50 consists of a ring of elastic material having U-shaped cross section which opens toward the dust filter. During operation, mud, small stones or other foreign material is prevented from passing into the bearing assembly by the dust filter 48 and only fluid reaches to the pressure-responsive packing 50, which radially expands in response to the pressure of the fluid to tightly close the space between the outer race and the inner race. Thus the seal 40 serves to seal the bearing assembly so as to prevent the foreign material from passing therein which otherwise would increase the wear of the bearing assembly.

Figure 5:
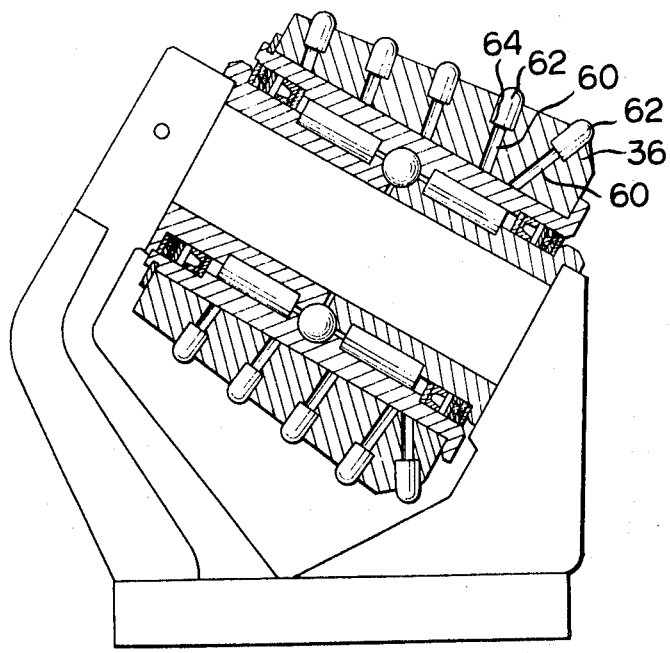
FIG. 5 is a sectional view similar to FIG. 2 showing a modified form of the present invention.
Figure 6:
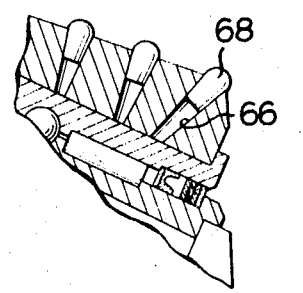
FIG. 6 is a fragmentary sectional view showing a modification of the cutting tip shown in FIG. 5.

FIG. 5 shows a modified form of the present invention in which the cutting portion of the cutter cone 36 is formed by cutter tips made of tungsten carbide. In this form the cutter cone has a plurality of radially extending holes 60 which pass through the cutter cone 36 from inside to outside and a plurality of cutter tips 62 inserted into each of said radial holes 60. In FIG. 5, each hole 60 is formed as a stepped hole having a shoulder 64 with which the bottom end of the cutter tip 62 engages. Thus the shoulder 64 serves to receive the load acting on the cutter tip and hold the cutter tip at the fixed position. The hole 60 may be made as a tapered hole as shown FIG. 6 which has a tapered wall 66 reducing its diameter toward the inside of the cutter cone. A cutter tip 68 having a tapered wall corresponding to said tapered wall 66 is inserted into the tapered hole.

Thus the respective cutter tips, which have been worn, can be separately removed and replaced by new ones, which eliminates the need for replacement of the whole cutter cone. The cutter tip can be easily removed from the cutter cone by pushing the bottom end by a suitable tool passing through the hole from the inside of the cutter cone.

It will be understood from the above description that according to the present invention the roller cutter can be easily disassembled to the respective elements and any element which has been worn or damaged can be easily replaced by a new one, without requiring the replacement of the whole roller cutter, so that a great economy can be obtained in the running cost of drilling.

While the preferred embodiment of the present invention has been described in detail with reference to the drawings, it will be appreciated that the invention is susceptible to modification, variation and change without departing from the scope of the appended claims.

What is claimed is:

1. A drilling bit for excavating a large diameter hole comprising a cutter head, a plurality of yokes fixedly mounted on said cutter head and a like plurality of roller cutters each rotatably supported on one of said yokes, each said roller cutter comprising a load pin supported at each end by said yoke, a bearing assembly and a cutter cone, said bearing assembly comprising a pair of aligned inner races mounted on said load pin, an outer race, and a set of bearing rollers and balls located between said inner races and said outer race, said cutter cone being fixedly mounted on said outer race of the bearing assembly and having a plurality of radially extending holes therein, said holes having tapered walls with the smaller diameter towards the inside of the cutter cone, a like plurality of cutter tips having a correspondingly tapered wall and being detachably mounted in said holes of the cutter cone, and means to detachably assemble said load pin, inner races, outer race, bearing rollers and balls, and cutter cone together.

2. A drilling bit according to claim 1, in which said outer race of the bearing assembly has a flange at one end and a peripheral groove at the other end, a snapring detachably assembled in said peripheral groove to hold said cutter cone in position on the outer race between said flange and said snapring.

3 A drilling bit according to claim 1, further comprising sealing means fitted between the outer race and the inner race of the roller cutter at each end thereof, each said sealing means comprising a dust filter positioned at the axially outermost end of the roller cutter and a pressure-responsive packing positioned axially inside of said dust filter and adapted to radially expand in response to pressure passing through said dust filter.